(No Model.)
R. W. JONES.
HARNESS SADDLE.
No. 359,078. Patented Mar. 8, 1887.
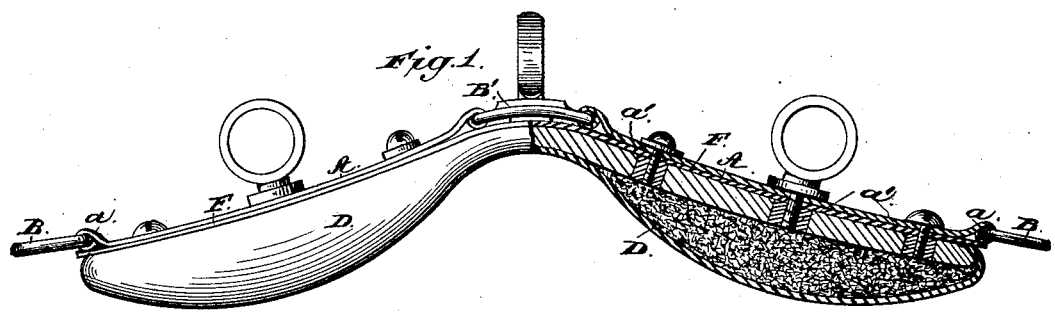
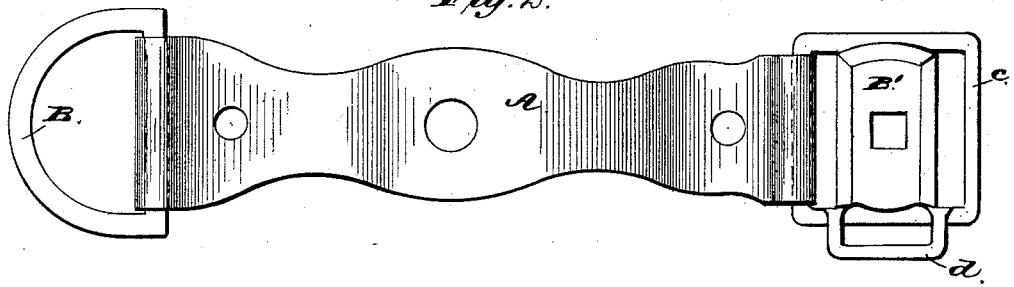
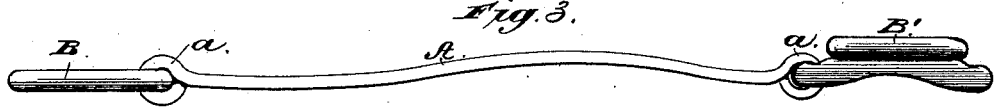
Witnesses:
Inventor:-
Richard W. Jones

UNITED STATES PATENT OFFICE.

RICHARD W. JONES, OF SYRACUSE, NEW YORK.

HARNESS-SADDLE.

SPECIFICATION forming part of Letters Patent No. 359,078, dated March 8, 1887.

Application filed January 17, 1887. Serial No. 224,538. (No model.)

*To all whom it may concern:*

Be it known that I, RICHARD W. JONES, a citizen of the United States, residing at Syracuse, in the county of Onondaga and State of New York, have invented certain new and useful Improvements in Harness-Saddles; and I do hereby declare the following to be a full, clear, and exact description of the invention, such as will enable others skilled in the art to which it appertains to make and use the same.

My invention relates to harness-saddles; and it consists in the construction and arrangement of the tree thereof, which will be more fully hereinafter described, and pointed out in the claims.

This invention relates to an improvement on Letters Patent No. 235,949, granted to me December 28, 1880, wherein a metallic tree was shown and described as being constructed of five parts, which were applied to the saddle separately and retained in connection therewith by means of a strap. In my present invention the tree is formed of a metallic continuous strip having the D directly attached thereto at its one end and the central plate at the other.

The objects of my present invention are to provide metallic trees for harness-saddles which allow of a hinged movement at the central part of the saddles, and which are simple and effective in their construction and arrangement, strong and durable, easily handled and readily understood, convenient in application, and cheaply manufactured. I attain these objects by the construction of tree and harness-saddle illustrated in the accompanying drawings, wherein like letters of reference indicate similar parts in the several views, and in which—

Figure 1 is a side elevation, partially in section, of a harness-saddle with my improvement shown as applied thereto. Fig. 2 is a top plan view of one of my improved trees. Fig. 3 is a side elevation of the same.

A indicates the side or tree plates, which are formed as may be desired, and provided with suitable perforations for the passage of the fastening-screws, and may be perforated for more securely attaching the housing to the pad by means of suitable tacks. These plates A are also provided with apertures for the passage of the shanks of terret-rings into the body of the pad, and may be further perforated for the passage of any ornamental attachments, if desirable.

The two ends of the tree A are bent to form loops *a a*, inclosing at one end the D B, and at the other end is bent around one of the side loops, *c*, of the central plate, B'. This central plate, B', carries a check-hook of the usual form, and may be cast with the plate or formed separately and secured thereto. In addition to the side loops, *c*, the said plate B' may also be provided with a back-strap loop, *d*. The pad D is also of the usual form and contains nuts *a' a'*, which are screw-tapped to receive the fastening and terret screws, which hold the parts of the saddle together, the housing F being interposed between the tree A and the top portion of the pad D, and which may be constructed of any material applicable for the purpose and ornamented in any desirable manner.

By means of the construction described I attain a harness-saddle having a tree which is strong and durable, and which dispenses with use of straps or any other intermediate connection between the central plate and the tree or D.

I do not claim any novelty for the pad or housing; but my invention embraces a metallic tree which is connected direct to the central plate and to the D.

To assemble the parts, the pad and housing are united in the ordinary and well-known manner. The continuous metallic tree A is then applied on top of the housing F, and the fastening-screws passed through their respective apertures, and the parts thereby firmly united.

When the tree has been set as described, the central plate, B', will be situated in its usual position, and the D B extending out over the edge of the housing F.

The tree may be formed with upward curves and downward depressions, as shown, so that it can be readily applied in connection with any form of saddle, whether of ornamental or general construction.

By the construction above described I am enabled to make a strong and yet flexible saddle that will adjust itself to the back of almost any animal, easily put together, and that can readily be taken apart when it becomes necessary to repair it or change the mountings.

Having thus described my invention, what I claim as new, and desire to secure by Letters Patent, is—

1. A harness-saddle tree consisting, essentially, of a pair of single metallic plates of suitable configuration, having loops formed at each end, which respectively inclose the D's and central plate, substantially as described.

2. A harness-saddle consisting of the pads D, housing F, trees A A, constructed of single pieces of metal of suitable configurations, the central piece, B', secured direct to one end of each of said trees, and D's B B, secured to their outer ends, and suitable terret-rings and connecting devices, constructed and arranged substantially as and for the purposes specified.

In testimony whereof I affix my signature in presence of two witnesses.

RICHARD W. JONES.

Witnesses:
   G. S. HIER,
   FND. FRAZER.